Dec. 1, 1959 B. B. BLOOM 2,915,121
MUSIC TIME GUIDE
Filed July 2, 1956 4 Sheets-Sheet 1

INVENTOR
BERTHA B. BLOOM
BY
ATTORNEY

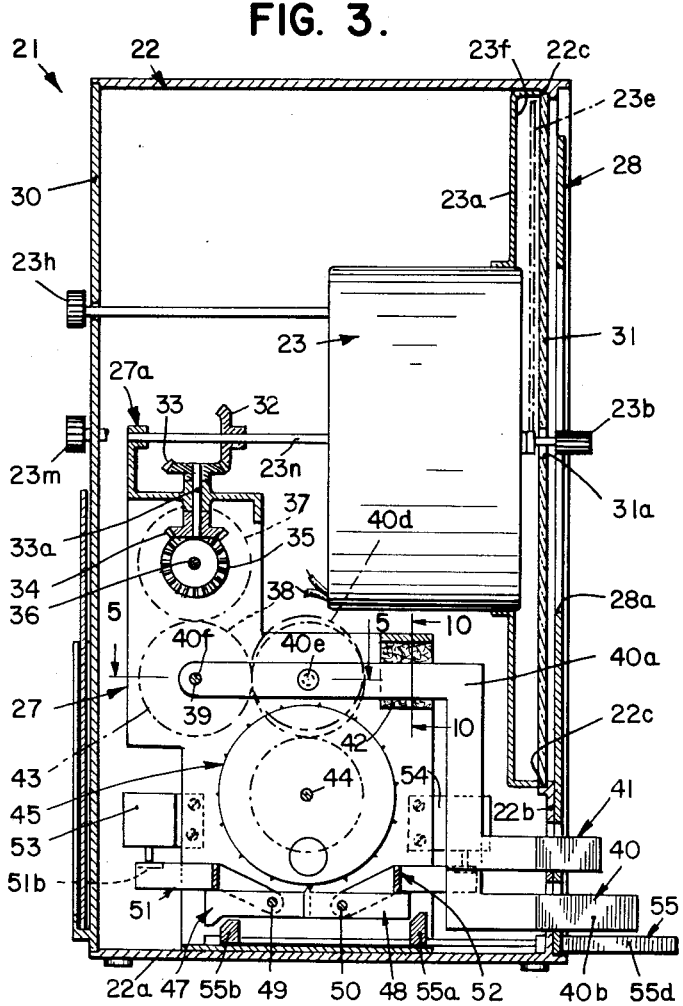

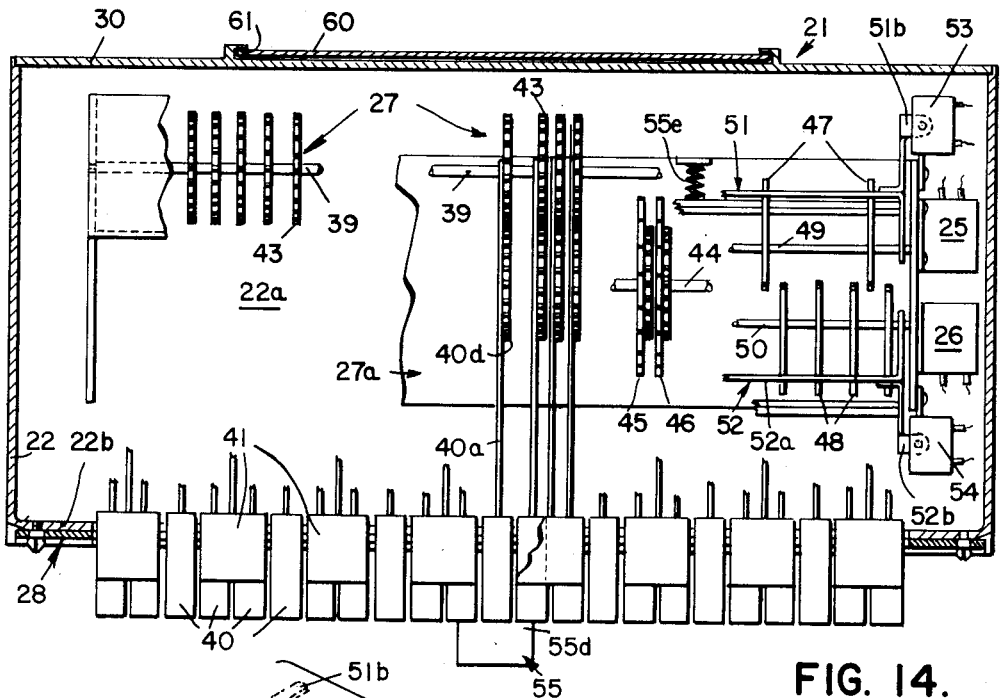
FIG. 11.
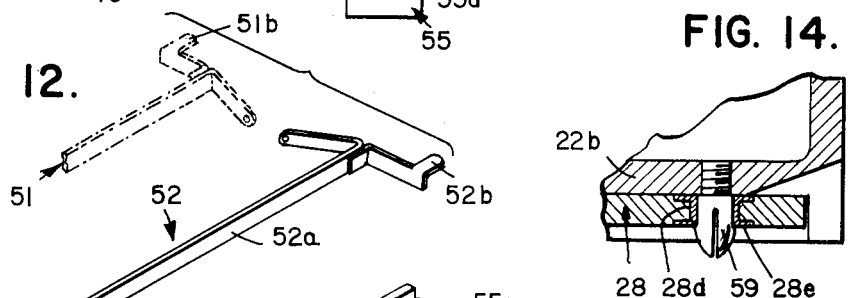
FIG. 12.
FIG. 14.
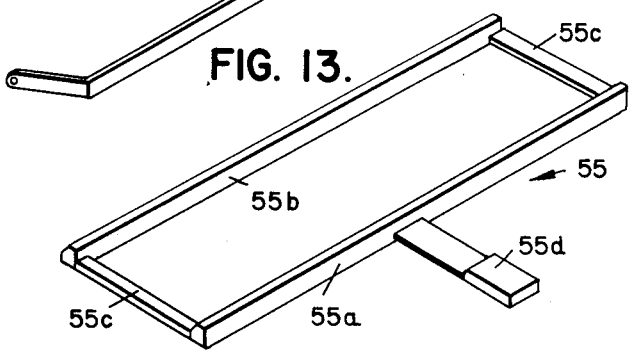
FIG. 13.
INVENTOR
BERTHA B. BLOOM
BY
ATTORNEY Dec. 1, 1959   B. B. BLOOM   2,915,121
MUSIC TIME GUIDE
Filed July 2, 1956   4 Sheets-Sheet 4

INVENTOR
BERTHA B. BLOOM
BY
*Albert J. Fihe*
ATTORNEY

United States Patent Office
2,915,121
Patented Dec. 1, 1959

2,915,121

MUSIC TIME GUIDE

Bertha B. Bloom, Los Angeles, Calif.

Application July 2, 1956, Serial No. 595,267

7 Claims. (Cl. 161—6)

This invention pertains to selective time-intervals annunciators and more particularly to devices of this nature as used primarily by instructors and/or students having interests in accurate timing of the execution of musical instruments or vocal renditions.

The prime object of my invention is to provide a device which produces a plurality of, preferably two, audible, time-spaced sounds or tones at preselected intervals, and so devised that said tones may be different so as to readily distinguish between them.

Another object is to provide a device described which provides further that the time-spaced tone of one pitch or intensity produces a greater number of sounds per time cycle than the other time-spaced tone of another pitch or intensity.

A further object is to provide a device as just described but providing further that time-spaced intervals, of the tone of one pitch or intensity, having the greatest number of sounds per time cycle, coincide with the second sound of lesser sounds per time cycle, said lesser number being a factor of the greater number.

For instance, if it were desirable to set one annunciator at sixty sounds per given time cycle of one minute, and the other annunciator at fifteen sounds per minute, the first of every four sounds of the first annunciator would coincide with one sound of the second annunciator.

Music-wise, this would be playing four beats to the measure and the rate of speed would be sixty beats per minute. In other words, the "Down" beat of each measure would be accentuated by virtue of both annunciators sounding simultaneously, hence, a compound rhythm and tempo is produced.

Yet another object is to provide an annunciator as previously described which provides further that either or both of the two tones may be selected to audible activation.

Another important object is to provide an annunciator as described and being further provided with means to insure the proper selection of time interval combinations, such insurance being in the form of limiting or predetermining the selector keys which may be used to activate the annunciators in combination only as provided for on an interchangeable face.

Other and further important objects of the invention will be apparent from the disclosures in the accompanying drawings and following specification.

The invention, in a preferred form, is illustrated in the drawings and hereinafter more fully described.

In the drawings:

Figure 3 is a vertical section on the line 3—3 of Figure 1.

Figure 4 is an enlarged section on the line 4—4 of Figure 2.

Figure 5 is a section on the line 5—5 of Figure 3.

Figure 6 is a perspective of one of the cam levers.

Figure 7 is a perspective of another one of the cam levers.

Figure 8 is a side elevation of one of the multi-toothed cams for activating one of the annunciator switches.

Figure 9 is a side elevation of another of the multi-toothed cams.

Figure 10 is a section on the line 10—10 of Figure 3.

Figure 11 is a plan view, portions being broken away and shown in section of the selector mechanism.

Figure 12 is a perspective exploded view of the actuating elements.

Figure 13 is a perspective view of the re-set element.

Figure 14 is an enlarged sectional view showing a corner detail of Figure 11.

As shown in the drawings:

Figure 1:
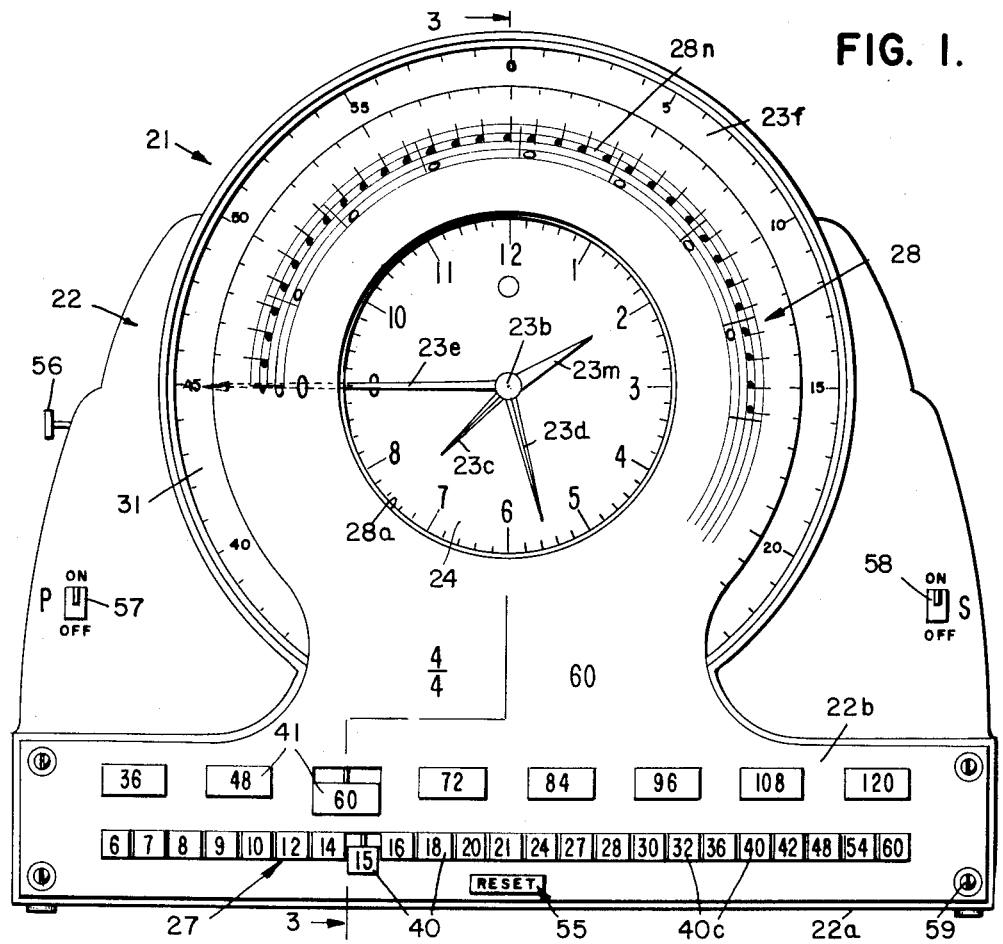
Figure 1 is a front elevation of the device embodying my invention.
Figure 2:
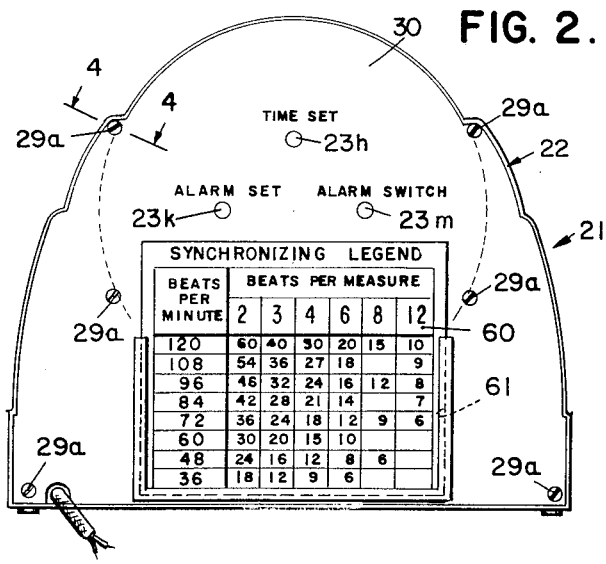
Figure 2 is a rear elevation of the device shown in Figure 1.

The annunciator generally is designated by the numeral 21, it comprising mainly a housing or case 22, a motive element 23 and its associated visual time-elapse indicia element 24, a primary annunciator 25, a secondary annunciator 26, a time-interval selective control mechanism 27, and an interchangeable indicia-element 28.

The case has a base portion 22a shown as substantially rectangular in contour, said base having its front wall 22b adapted to receive the selector keys of the time-interval selector control mechanism 27.

The motive element 23 has a mounting plate 23a adapted to be fixed to the front wall of the case as by studs 29, the studs extending rearwardly and being adapted to receive screws 29a for fastening the rear cover 30 to the case 22.

The time-indicating indicia element or dial 24 of the motor 23 is positioned behind the transparent disc 31 mounted in a recess 22c in the front wall of case 22 (see Fig. 3), said disc being apertured as at 31a to permit protrusion of an adjusting knob 23b.

Motor 23 is further provided with conventional hour-indicating hand 23c, minute-indicating hand 23d and second-indicating sweep hand 23e. Hands 23c and 23d are positioned to rotate in an area rearwardly of the front margin of the motor 23, whereas the sweep hand 23e extends beyond the radial margin of the motor case and in front of the motor but behind the transparent face 28. Transparent face 28 and indicia element 28 are the same, and is transparent so that the sweep hand can be seen as it passes the music notation.

Indicia element 28 is apertured as at 28a to permit viewing the clock dial 24 of the motor 23, and the upper, near-circular portion of the indicia element 28 has its peripheral margin spaced inwardly from the margin defined by the recess 22c in the case 22, thus exposing the outer margin 23f of frame or plate 23a of the motor 23.

Margin 23f of the plate 23a is provided with indicia to indicate the seconds of time elapsed.

Knob 23b actuates a conventional clutching type of shaft to rotate second-hand 23e to a starting "0" position irrespective of its position at the time of making this adjustment. This adjustment is made when the user desires to synchronize the position of the sweep second hand 23e with the "down" beat at the starting line on the indicia element 28.

Motor 23 is further provided with conventional time adjusting screw or thumb nut 23h, an alarm setting knob 23k and an alarm switch knob 23m.

Figure 15:
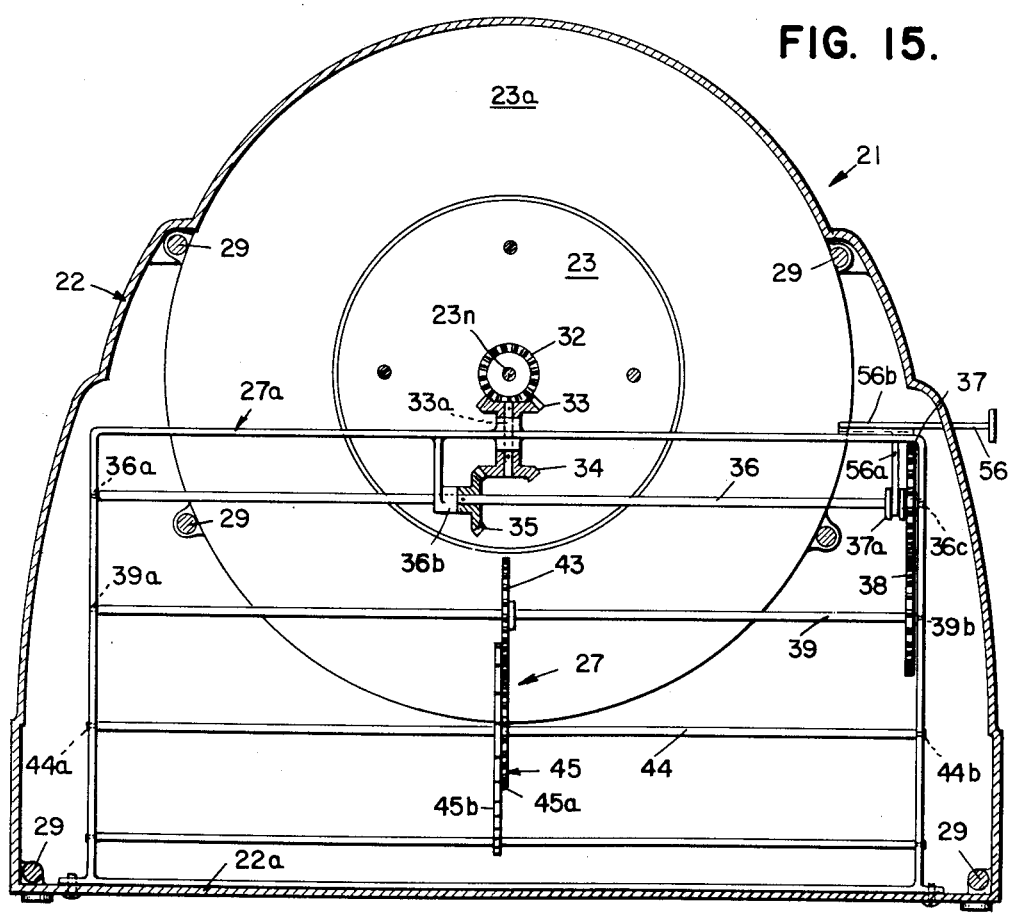
Figure 15 shows certain portions of the interior mechanism.
Figure 16:
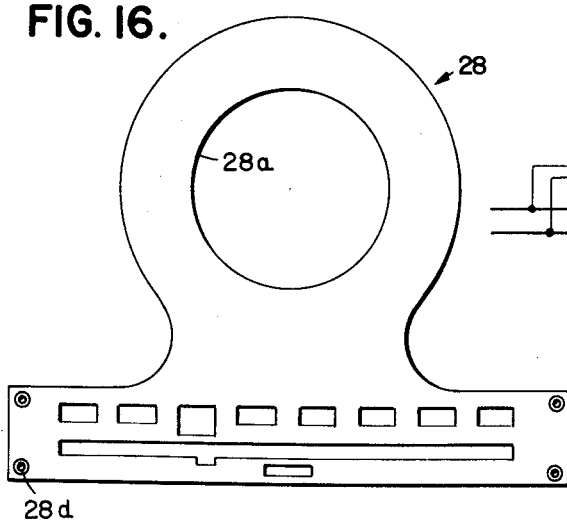
Figure 16 is a front elevation of one of the interchangeable indicia elements, the view being that of a blank for the corresponding part shown in Figure 1.

Motor 23 has its "second-indicating hand" shaft 23n extended rearwardly, its extreme end being journaled for rotation in the frame 27a of the selector element 27. Shaft 23n carries a miter gear 32 which meshes with another miter gear 33 of equal number of teeth so as to maintain the same rotative speed as shaft 23n. Gear 33 is keyed to one end of the shaft 33a which is journaled in the frame 27a, the other end of the shaft having keyed thereto a miter gear 34 which meshes with miter gear 35 keyed to a shaft 36 journaled in the frame 27a as at 36a, 36b and 36c (Fig. 15).

Shaft 36 as at 36c has a splined gear 37, which is, as the name implies, slidably keyed to said shaft and may move axially along the same so as to permit said gear to mesh with or become divorced from its mating gear 38, both gears 37 and 38 having the same number of teeth for reasons before stated.

Gear 38 is keyed to a shaft 39 which is journaled in frame 27a as a 39a and 39b, said shaft having mounted thereon for pivotal movement a plurality of key-lever elements 40 and 41 and also mounted on said shaft are a plurality of gears 43 geared to the shaft for rotatable movement with gear 33.

Key-lever elements 40 control the activating of annunciator 25 and key-lever elements 41 control the activating annunciator 26. Except for the dimensional proportions of the key portion of the key-levers, they are identical and therefore only key-lever 40 will be further explained. The key-lever element consists of a Z-shaped lever 40a, a key 40b having indicia 40c and a gear 40d mounted for free rotation on a pin 40e fixed in the lever 40a. The lever 40a is provided with an aperture 40f for free pivotal movement on the shaft 39, pivotal movement of the key-lever being partially arrested by friction elements 42 fixed on the frame 27a so that the key-lever may be retained in raised or lowered position at will. Pivotal movement of the key-levers causes either meshing or separation of continuous drive from the selective drive.

Each of the plurality of gears 43 meshes with a gear 40d on key-lever 40 or with a gear 40d on lever 41 and again, they have identical number of teeth in order to maintain the ratio as previously stated.

A shaft 44 is fixed in the frame 27a as at 44a and 44b, said shaft carrying a plurality of cam-gear elements 45 and 46, all cam-gear elements being mounted for free rotation on the shaft 44. Cam-gear 45 consists of a gear 45a, having a number of teeth equal to the number of teeth on the gear 40d, and a cam 45b having lobes 45c. The number of lobes equally spaced around the periphery vary according to the number of tones per minute, one lobe for every tone. The cam-gears are apertured as at 45d for free rotation on the shaft 44, a counter weight 45e being incorporated in the cam-gear to insure "0" alignment when cam-gear is free to rotate.

Cam-gears 46 are identical with cam-gears 45 except that the number of lobes on the cam vary in most cases.

Thus, with the depression of any key-lever, the gears 45a and 46d are made to mesh with gears 40d, causing lobes 45c and/or 46c to activate the annunciator switches, as will be described.

A plurality of cam-levers 47 having lobes 47a are mounted for pivotal movement on a shaft 49 fixed at its ends in the frame 27a, also a plurality of cam-levers 48 having lobes 48a are mounted for pivotal movement on a shaft 50 fixed at its ends in the frame 27a. As viewed in Fig. 3, the group of cam-levers 47 is positioned on one side of the center line of the shaft 44 and the group of cam-levers 48 is positioned on the other side of the center line of the shaft 44, the lobes 47a and 48a being directly on the center line of the shaft 44.

Figure 17:
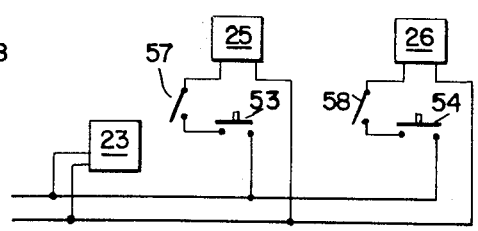
Figure 17 is a diagram of the electrical circuit in schematic form.

Overlying the groups of cam-levers are yokes 51 and 52, yoke 51 overlying the group of cam-levers 47 and yoke 52 overlying the group of cam-levers 48. Yoke 51 is pivotally mounted on shaft 49 and yoke 52 is pivotally mounted on shaft 50. Each yoke has a longitudinal bar connecting the end members, as for instance in Fig. 12, yoke 51 having such a bar 52. The yokes are further provided with switch-actuating tabs 51b and 52b respectively. Thus, any cam-lever 47 causing yoke 51 to pivot, will, through the tab 51b, actuate switch 53 to energize annunciator 25 and any cam-lever 48 causing yoke 52 to pivot, will, through tab 52b, actuate switch 54 to energize annunciator 26 (Fig. 17).

When changing from one selected setting of the key-levers to another setting, a reset element 55 is urged rearwardly to remove lobes 47a and 48a from the path of travel of the lobes 45c and 46c of their respective levers and cam-gears, and thus, with all key-levers in their uppermost position, the cam-gears will resume an "0" position for synchronization of the next setting of the key-levers.

The reset element 55 consists of longitudinal members 55a and 55b, connected at their ends by cross members 55c (Fig. 13), the front longitudinal member 55a having a projection 55d which protrudes through the case 22 for access by the user. The reset element is guided in the frame 37a and is spring pressed forwardly by a spring 55e. The rear edges of the members 55a and 55b are beveled so as to cause cam-levers 47 and 48 to pivot when the reset element is moved rearwardly and upon releasing pressure on the member 55d the reset element will return to its normal position, thereby allowing cam-levers to assume their respective positions. As previously stated, with all key-levers in their uppermost position, the reset element pressed rearwardly, all cam-gear elements will resume their "0" alignment position.

In order to disconnect the motor drive mechanism from the selective mechanism, a shifter button 56 is adapted to move gear 37 axially along the shaft 36 to divorce gear 37 from gear 38. Button 56 is mounted on the end of a stem 56b which is slidably mounted on the frame 27a, and the stem 56b has a bifurcated member 56a which registers in a flanged collar 37a fixed to the gear 37.

In order to make audible or silent either or both of the annunciators without disturbing the key-lever setting or the time elapse indicating system, I provide a switch 57 to make or break the electric circuit to annunciator 25 and a switch 58 to make or break the electrical circuit to annunciator 26.

The interchangeable indicia-element 28 may be made from opaque cardboard or may be a translucent material, the latter having the advantage of the visual qualities should it be desirable to provide illumination in the case.

The interchangeable indicia-element 28 has its upper portion having a contour near-circular and is apertured at 28a to expose for view the dial 24 of the element 23 and the lower portion of the indicia-element is substantially rectangular and has apertures 28d for grommets 28e (Fig. 14). The front wall 22b of the case 22 is provided with pins 59 for releasably securing the indicia-element to the case.

The indicia-element 28 is further provided with apertures 28f for the key portion of the key-lever elements 41 and aperture 28g for the key portion of key-lever 40; also aperture 28h for the reset element projection 55d. One of the apertures 28f is enlarged at its lower end as at 28k to provide downward movement of the selected key-lever 41, and aperture 28g is notched as at 28m to provide for downward movement of the selected key-lever 40. Thus, an indicia-element fabricated for a pre-selected key setting, will permit the movement of only such key or keys as has been provided for in the particular indicia-element.

I claim as my invention:

1. An improved audio-visual time indicator, comprising a housing, a panel removably carried by the housing and having circularly spaced indicia thereon visually indicative of a series of musical beats, a motor, a marker movable at constant speed by said motor in a circular path into successive registration with said indicia in response to motor operation, means operable by said motor to produce a series of repetitive and interrupted sounds occurring only during registration of said marker with said indicia for audibly emphasizing registration of said marker with said indicia, said means including rotary parts having different numbers of circularly spaced shoulders thereon and elements movable to effect production of said sounds in response to successive engagement of said part shoulders therewith, manually bodily movable actuators and means operable thereby to couple and decouple said motor with said parts, said panel having a series of openings through which said actuators project so as to be exposed at one side of the panel, at least one of said panel openings being enlarged to allow bodily movement of at least one actuator in the plane of said panel, the remainder of said panel openings being relatively reduced in size so that bodily movement of the remaining actuators projecting therethrough and in the plane of the panel is blocked by said panel, said one actuator being movable to effect production of said series of repetitive and interrupted sounds.

2. The invention as defined in claim 1 including other means operable by said motor to produce an additional series of repetitive sounds of different tone than said first sounds and occurring only during registration of said marker with the first indicia in each of like groups of said indicia progressively traversed by said marker.

3. The invention as defined in claim 2 in which said other means includes other rotary parts having different members of circularly spaced shoulders thereon and other elements movable to effect production of said different tone sounds in response to successive engagement of said other part shoulders therewith, and other manually bodily movable actuators individually movable to couple and decouple said motor with said other rotary parts, said panel having another series of openings through which said other actuators project so as to be exposed at said one side of the panel, at least one of said other openings being enlarged to allow bodily movement of at least one of said other actuators in the plane of said panel, the remainder of said other panel openings being relatively reduced in size so that bodily movement of the remainder of said other actuators in the plane of said panel is blocked by the panel, said one of said other actuators being movable to effect production of said different tone sounds.

4. The invention as defined in claim 1 comprising a translucent panel.

5. The invention as defined in claim 1 in which said panel has an annular upper portion carrying said indicia and a lower portion containing said openings through which two of said actuators project, said two actuators being movable in their openings.

6. The invention as defined in claim 5 including a clock face centered behind the panel annulus and circularly spaced seconds indicia in the path of said marker.

7. The invention as defined in claim 1 in which said indicia comprise musical notes.

References Cited in the file of this patent

UNITED STATES PATENTS

| | | |
|---|---|---|
| 740,137 | Humpidge | Sept. 29, 1903 |
| 1,261,382 | Grimson | Apr. 2, 1918 |
| 1,887,857 | Miessner | Nov. 16, 1931 |
| 2,048,881 | Morrison | July 28, 1936 |
| 2,078,505 | Morrison | Apr. 27, 1937 |